S. C. HATFIELD.
ELASTIC WHEEL.
APPLICATION FILED DEC. 18, 1915.

1,324,114.

Patented Dec. 9, 1919.
3 SHEETS—SHEET 1.

Witnesses

Inventor
Schuyler C. Hatfield
By Edwin P. Samuels
Attorney

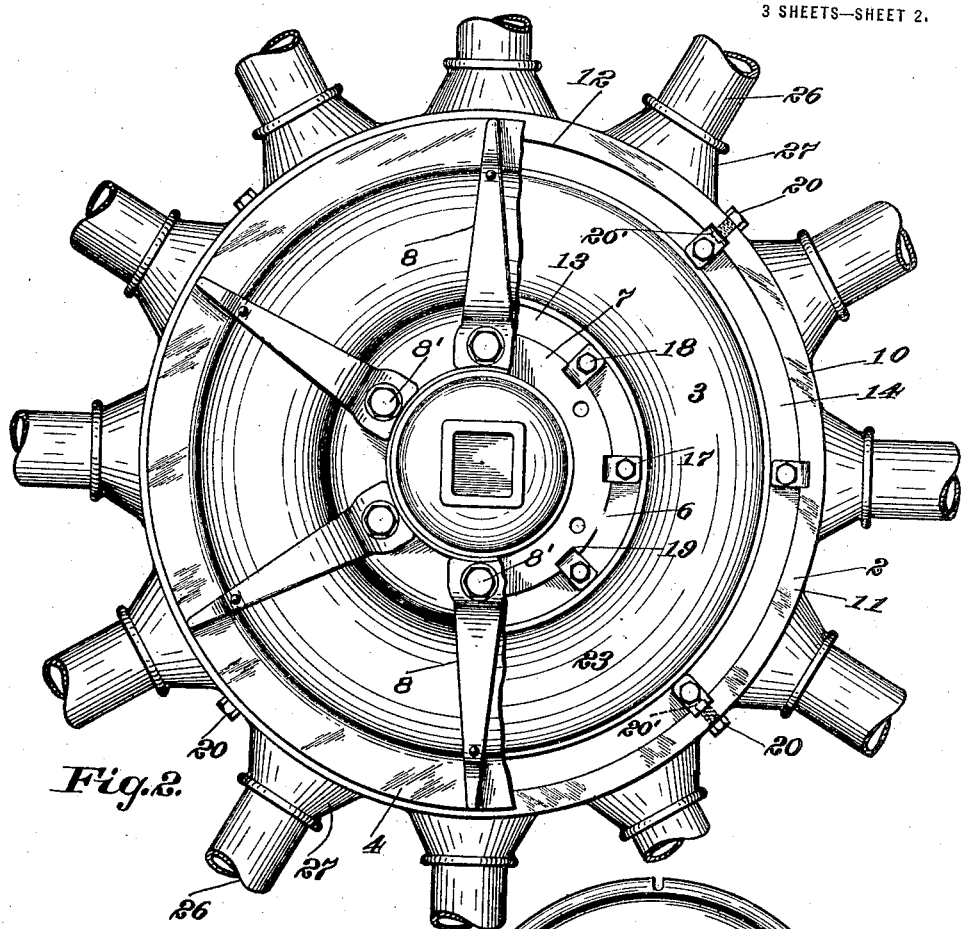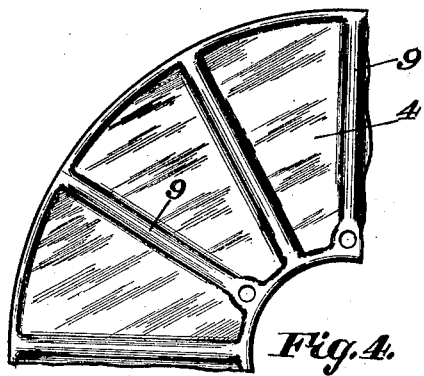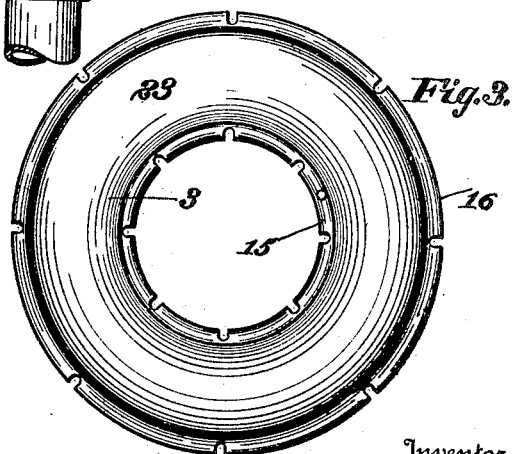

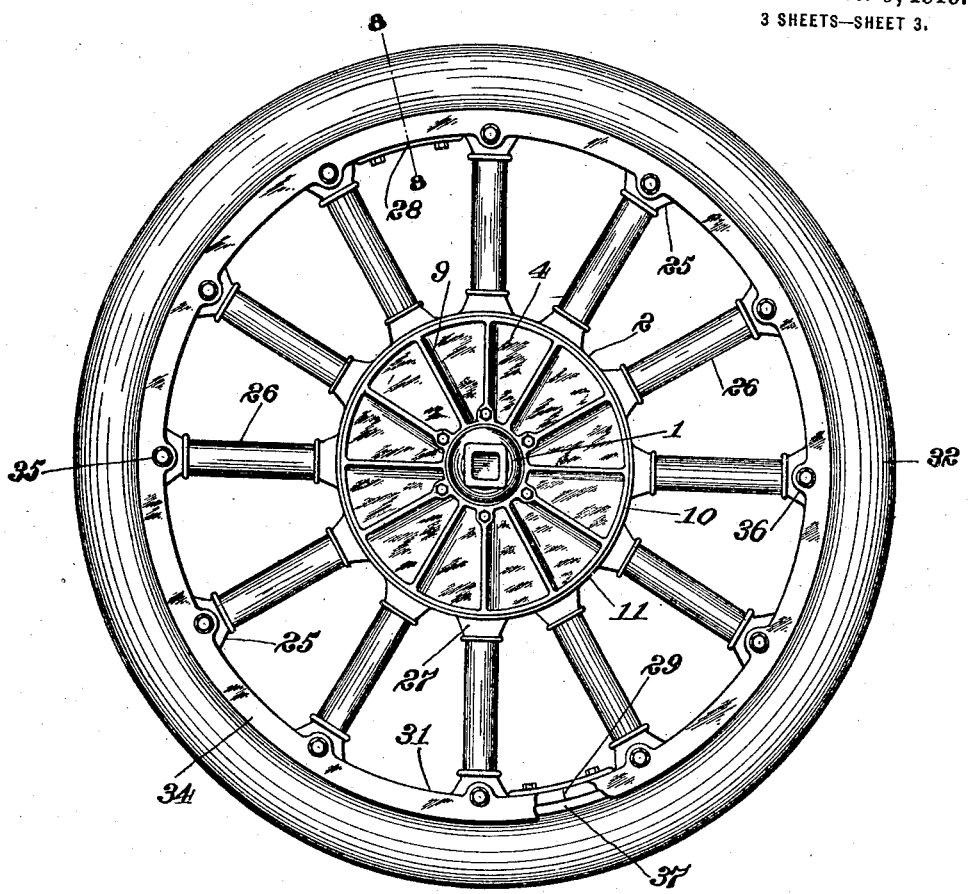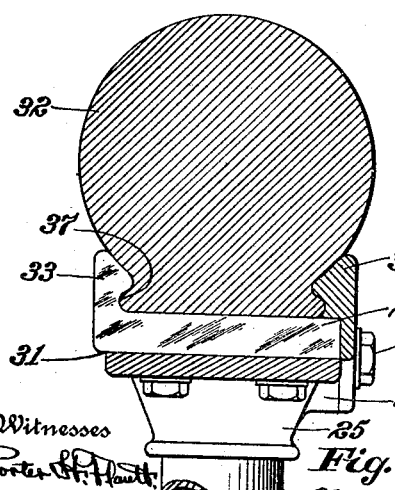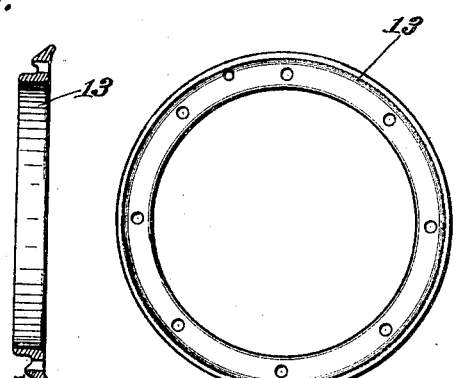

UNITED STATES PATENT OFFICE.

SCHUYLER C. HATFIELD, OF BALTIMORE, MARYLAND.

ELASTIC WHEEL.

1,324,114.   Specification of Letters Patent.   Patented Dec. 9, 1919.

Application filed December 18, 1915. Serial No. 67,528.

*To all whom it may concern:*

Be it known that I, SCHUYLER C. HATFIELD, a citizen of the United States of America, residing in the city of Baltimore, State of Maryland, have invented certain new and useful Improvements in Elastic Wheels, of which the following is a specification.

The expense incident to the maintenance of pneumatic tires used on motor vehicles and the delays due to punctures and blowouts, to which all pneumatic tires used on the road surface, are subject, are so well-known to the public that they need not be discussed. Numerous attempts have been made on this account to do away entirely with the pneumatic tire but the use of an air cushion in the wheels seems to be essential to an easy riding vehicle. The applicant has solved this problem by the production of a wheel having a pneumatic tire or pad, but instead of encircling the periphery of the wheel, this tire or circular pad is placed well inside the circumference of the wheel and the peripheral tire is made of solid fabric, rubber or any material which will give sufficient tractive power and take up the small irregularities of the road.

To provide for the internal pneumatic pad or tire, the wheel is made in two sections and the pad in the shape of a small tire is placed between the two sections encircling the inner one and means is provided for joining the sections whereby they are permitted to have radial movement relatively to each other but are restrained from relative motion in the direction of the axis.

The applicant has taken out several patents along these general lines, Nos. 1,105,654 and 1,087,903, and the present application relates to a number of details or refinements which, when applied to the broad idea, result in a new and improved device which may be termed a final or commercial form embodying the original invention. An advantage of this device over the others is that it can be applied at the smallest possible cost to any type of machine and there is but one part which must be made special for each particular hub and axle so that the main portion of the wheel can be gotten out in duplicate in large quantities, the only variation being as to the external diameter, that is, it must of course be made in the various commercial sizes.

An important feature of the invention is found in the hub casting which must be formed internally to fit the bearings of the particular wheel but which is of uniform external diameter or may be made in several sizes to provide for wheels of different diameters. The hub casting has a peripheral seat for the annular pad or internal tire which is, in fact, a circular surface inclosing the periphery of the casting. This is of uniform diameter for wheels of the same size but may be varied in constructing wheels of different sizes. The tires or pads are secured by means of rings corresponding to the usual demountable rim and the outer surface of the hub casting is preferably made to receive the tire or rings.

The outer portion of the wheel, consisting of the inner rim, the outer rim and the spokes, may be a knock-down device, having all the parts removable and interchangeable, and the parts may be made to coöperate by dove-tailing, keying or the like. The inner rim is also provided with a seat for the pneumatic pad or the rings which hold the pad. In this way it is made possible to change the pneumatic pads or inner tires instantaneously and an extra pad inflated ready for use may be carried in the tool box or under the seat.

Attached to the hub, along surfaces at right angles to the axle and near the periphery of the hub, are annular plates, preferably made of non-corrosive material and either reinforced by radial rods or having radial corrugations. These plates engage flat surfaces on the inner rim of the outer portion of the wheel and permit the parts to slide radially, relatively to each other. The plates may be curved outward intermediately to provide for the expansion of the pad.

In the accompanying drawing, I have illustrated so much of an elastic wheel embodying my invention as is necessary to a complete comprehension of the device.

In the drawings, Figure 1 is a section taken in a vertical plane of the axis of the wheel showing the general structure; and Fig. 2 is a fragmentary view of the hub section, etc.;

Fig. 3 is a side elevation of the pad;

Fig. 4 is a fragment of a corrugated guide plate;

Fig. 5 is a view of one of the seating rings in section, and Fig. 6 is an elevation of same;

Fig. 7 is an elevation of entire wheel;

Fig. 8 is a detail showing the center rim and tire in section on line 8—8.

Figure 1:
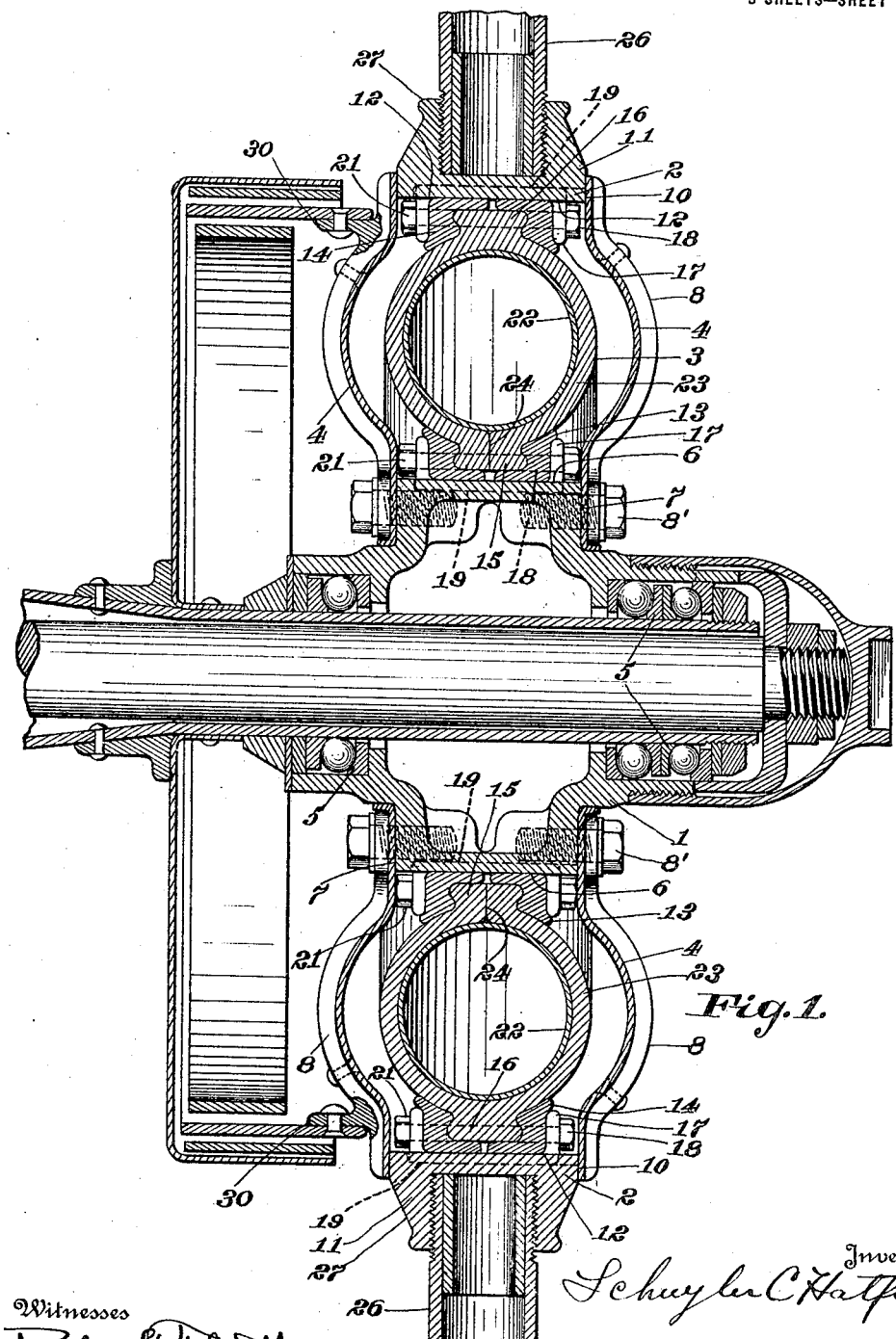

Referring to the drawings by numerals, the wheel consists of a hub section 1 and an outer section 2 with an internal tire, or annular pneumatic pad 3 between the inner and outer sections and annular plates 4 for connecting the inner and outer sections so as to permit them to move relatively one to the other in a radial direction, but to prevent them from having any relative motion in the direction of the axis.

The hub section 1 is formed internally to fit the particular vehicle, either to receive the bearings 5, if it is a front wheel, or to engage the rear shaft, if it is a rear wheel. Externally, the hub sections 1 are of uniform dimensions and configuration, at least as to the portion near the periphery, so that the remainder of the wheel can be uniform in all instances in wheels of each particular diameter.

The hub section, as shown, has its peripheral surface 6 cylindrical in form with its axis co-incident with that of the wheel. The sides or ends of the hub have two flat annular faces 7 at right angles to the axis of the wheel and therefore at right angles to the peripheral surface. To these flat annular faces 7, the guide plates 4 are secured. These are preferably of bronze or other non-corrosive material, made thin and light and reinforced by radial ribs 9 which in light work may be formed as corrugations in the thin metal, as shown in Fig. 4, but in the heavier constructions, are preferably iron or steel braces 8 secured by any suitable means as bolts 8', see Figs. 1 and 2. The plates 4 are preferably curved outward centrally to provide for flattening of the tire in response to the shocks to which the wheel is subjected. The inner rim 11 is a circular band or ring adapted to receive the inner ends of the spokes and having on its inner surface a suitable seat 12 for the outer periphery of the inner tire or pneumatic pad, and flat surfaces 10 on each side. At their outer peripheries, the plates 4 each bear on a flat circular surface 10 of the inner rim 11 of the outer section 2, and the parts are arranged to slide freely in the plane of the surface 10 giving the relative motion of the parts in a radial plane as already described, so that the resiliency of the pad 3 may be available to take up the shocks of the road.

The inwardly disposed cylindrical surface 12 of the inner rim 11 of the outer section 2 corresponds to the outer or peripheral cylindrical surface 6 of the hub, and these two surfaces coöperate as an inner and outer seating means for the tire or pad 3. This pad may be mounted in various ways, but it is preferably held in position by means of seating rings 13 coöperating with the hub, and 14 coöperating with the inner rim of the outer section and corresponding to the well-known demountable rims used in connection with peripheral or tread tires. The rings 13 and 14, as shown, engage inner and outer beads 15 and 16 on the pad. The seating rings 13 and 14 are preferably split or made in pairs, one engaging each side of the bead, and the parts of the rings, as shown, are held together by U-shaped clamps 17 and bolts 18. The inner and outer surfaces 6 and 12 are provided with seats for the clamps 17, the seats being in the form of grooves 19 extending inward from one of the surfaces 10 and 7 in the direction of the axis. The outer rings 14 with the bead 16 are held in position against lateral motion by radial bolts 20 passing through the inner rim 11 and seated at their ends in sockets 20' in clamps 17, and the tire or pad may be positioned in relation to the hub section by the ends of the bolts 18 and the nuts 21 thereon. As shown, the tire has an inner tube 22 and an outer shoe 23, the latter being opened at the inner periphery 24 and held in mounted or closed position by means of clamps 17 and the rings 13 engaging the split bead 15 from both sides.

Referring to the outer section 2 of the wheel, this is made up of a felly 31 which may be of metal and have sockets 25 for the spokes 26, also of metal. The inner rim 11 is also preferably a metal band having sockets 27 which may be threaded to receive the spokes, which may likewise be threaded, and the outer rim or felly 31 may be made in sections joined at 28 and 29 by any suitable means so that the entire outer portion 2 of the wheel is made interchangeable and capable of being knocked down and assembled at will.

The outer rim is provided with any suitable solid tire of fabric, rubber or the like 32, held in position by any suitable means as an integral flange or bead 33 and a detachable ring or flange 34 which may be secured by means of bolts 35 engaging bosses 36 on the outer rim or felly, the tire being provided with suitable beads 37 to coöperate with the outer rim or felly.

In the case of a rear wheel, it is of course necessary to provide a brake and to this end, certain of the radial ribs 9 are provided with brackets 30 to which the brake cylinders are conveniently attached.

The manner of setting up and using the wheel is apparent from the preamble and description, the object being to produce a commercial form of elastic wheel which is interchangeable as far as it is possible to make a wheel of interchangeable parts in that it may be applied to all machines having the same size wheels with but one part to be made special. It is further interchangeable as to its parts which may all be made removable and standardized, and is otherwise cheap to manufacture, easy to set up, and possesses the elastic features of the prior patented devices referred to and other refinements and conveniences of construction hereinbefore set forth.

I have thus described my invention specifically and in detail in order that its nature and operation may be fully understood; however, the specific terms herein are used descriptively rather than in their limiting sense and the scope of the invention is defined in the claims.

I claim:

1. In a pneumatic wheel, an outer section having an inner rim, a hub section within the inner rim, an annular pneumatic pad between the hub section and the inner rim, and plates for guiding the hub and outer section so that they move relatively in a radial plane, the hub section having a peripheral rib with flat radial surfaces to receive the guide plates, the rib being of sufficient radius its external dimensions being constant to make the hub section fit any wheel, the remaining parts of the wheel being interchangeable so that they may be standardized.

2. In an elastic wheel in combination, an outer section having an inner rim, a hub section, a pneumatic pad between the sections, means for guiding the outer section and the hub section to move relatively in a radial plane, the pad having a peripheral bead, locking rings to hold the pad in position, of cross-sectional configuration to fit the bead, and clamping means in the form of U-shaped members to take over the rings and hold the parts in locked position.

3. In an elastic wheel in combination, an outer section having spokes and an inner rim, a hub section within the inner rim, a pneumatic pad between the sections, the hub section having a peripheral rib of large diameter so that the hub may be fitted internally to any bearing and the rib be made of uniform outer dimensions in all instances, the remaining parts being interchangeable, the outer section having spoke sockets secured to the inner rim, an outer rim with corresponding spoke sockets secured to the outer rim and hollow spokes engaging the sockets.

Signed by me at Baltimore, Maryland, this 17th day of December, 1915.

SCHUYLER C. HATFIELD.

Witnesses:
ZELLA KUHN.
EDWIN F. SAMUELS.